(12) United States Patent
Kvryan et al.

(10) Patent No.: US 11,474,046 B2
(45) Date of Patent: Oct. 18, 2022

(54) CORROSION DETECTION SYSTEMS AND METHODS (71) Applicants: Armen Kvryan, Oxnard, CA (US); Todd Coursey, Moorpark, CA (US)

(72) Inventors: Armen Kvryan, Oxnard, CA (US); Todd Coursey, Moorpark, CA (US)

(73) Assignee: United States of America, as Represented by the Secretary of the Navy (*) Notice: Subject to any disclaimer, the term of this patent is extended or adjusted under 35 U.S.C. 154(b) by 1 day.

(21) Appl. No.: 17/039,958

(22) Filed: Sep. 30, 2020

(65) Prior Publication Data
US 2021/0148832 A1 May 20, 2021

Related U.S. Application Data (60) Provisional application No. 62/938,313, filed on Nov. 20, 2019.

(51) Int. Cl.
G01N 21/88 (2006.01)

(52) U.S. Cl.
CPC ... *G01N 21/8806* (2013.01); *G01N 2201/088* (2013.01)

(58) Field of Classification Search
CPC ............. G01M 11/086; G01M 11/083; G01M 11/085; G01M 5/0033; G01N 17/04; G01N 17/006; G01N 29/2475; G01N 21/8806; G01N 33/2045; G01N 2201/088; G01B 11/165; G01D 5/268; G01D 5/35316; G01D 5/35383

USPC ......... 356/32, 478, 73.1; 385/12, 37, 13, 10; 250/227.14, 227.18, 227.16
See application file for complete search history.

(56) References Cited

U.S. PATENT DOCUMENTS

| | | | | |
|---|---|---|---|---|
| 5,646,400 | A * | 7/1997 | Perez | G01N 21/774 250/226 |
| 6,204,920 | B1 * | 3/2001 | Ellerbrock | G01D 5/35383 250/227.13 |
| 10,895,566 | B1 * | 1/2021 | Teepe | G01D 5/268 |
| 2002/0153882 | A1 * | 10/2002 | Grimes | G01N 27/72 324/209 |
| 2006/0049341 | A1 * | 3/2006 | Wang | G01M 11/083 250/227.14 |
| 2019/0011491 | A1 * | 1/2019 | Raghavan | G01R 19/2513 |
| 2021/0123797 | A1 * | 4/2021 | Kiesel | H01F 27/14 |

* cited by examiner

*Primary Examiner* — Hoa Q Pham
(74) *Attorney, Agent, or Firm* — NSWC PHD Patent Office; Gregg Sharp; Arthur K. Samora (57) ABSTRACT Corrosion detection systems and methods can include at least one fiber optic cable embedded in a material having at least two layers. Two of the layers can define an interface, and the fiber optic cable can be embedded at the interface. Each fiber optic cable can have a plurality of Fiber Bragg Gratings (FBG's) formed therein at predetermined intervals. Each FBG can have a preselected geometry that can only allow a predetermined light wavelength to pass therethrough. A light source for inputting light and a photodetector can be connected to opposite exposed ends of the fiber optic cable. As corrosion occurs near an FBG, it experiences mechanical strain, which can further cause a slightly different wavelength to pass through the fiber optic cable. The change in in wavelength can be detected by the photodiode as being indicate of corrosion occurring at the site near the FBG.

6 Claims, 11 Drawing Sheets

CORROSION DETECTION SYSTEMS AND METHODS

This patent application claims the benefit of the filing date of U.S. Provisional Application No. 62/938,313, which was filed on Nov. 20, 2019 by Armen Kvryan et al., for an invention entitled "Corrosion Detection Systems and Methods".

FEDERALLY-SPONSORED RESEARCH AND DEVELOPMENT

This invention (Navy Case No. 112129) is assigned to the United States Government and is available for licensing for commercial purposes. Licensing and technical inquires may be directed to the Office of Research and Technical Applications, Naval Surface Warfare Center, Port Hueneme Division, Code 00T, Port Hueneme, Calif., 93043-4307; voice (805) 228-7518.

FIELD OF THE INVENTION

The present invention pertains generally to corrosion detection systems. More specifically, the present invention can pertain to corrosion detection systems and methods that test for corrosion in an unobtrusive, non-destructive manner. The invention is particularly, but not exclusively, useful as a corrosion in a non-destructive manner using fiber optic cables that can be embedded in the materials to be tested.

BACKGROUND OF THE INVENTION

Corrosion detection systems and methods are well-known in the prior art. Typically for these systems, it can often be preferable for the systems to detect any corrosion that may or may not be present in a non-destructive fashion. One way to accomplish this can be to afford a system that uses sensors. The sensors can be placed on the surface of the material to be tested, and the sensor outputs can be sent to a control box for interpretation of the output, which can be indicative of the corrosion that may/may not present in the material.

There are systems where the above drawbacks can be disadvantageous. First of all, many systems in the prior art can often deploy the systems sensor on the surface of either side of the material that is being monitored for corrosion. This can be a problem because for many materials and in particular laminates and other materials where one layer is coated by another layer, the corrosion can often manifest in the interface between the two layers. Thus, by the time the sensor on the layer surface detects the corrosion, the corrosion has already sufficiently progressed through one of the layers to be detected by the sensor.

Another challenge can be found in scenarios where a large surface area is to be monitored. Corrosion may be occurring in one portion of the surface area to be monitored, but if a sensor is not nearby, the corrosion may not be detected until it becomes extensive enough to reach a sensor (which again is on the surface). In still other scenarios, it may not be feasible to place a sensor on the material to be monitored because there may not be enough physical clearance to accommodate the sensor, such as in a shipboard or aircraft environment. Other sensors may have or need unacceptable size, weight and power (SWaP) requirements.

It can also be desirable to provide a corrosion system that can be immune to electro-magnetic interference, that can be corrosion resistant when considered as a standalone system, and that has little potential for electrical sparking. It can further be desirable to provide a system that can monitor corrosion in real time. Conventional corrosion inspections are costly and take many man hours. A corrosion detection with real time capabilities can move the end user from a preventative maintenance paradigm to a condition based maintenance paradigm.

The above can be particularly true in the case of steel. Coatings, either soft or hard, are commonly used to protect steel against corrosion for longer service life. With coatings, assessing the corrosion behavior and status of the substrate is challenging without destructive analysis. It can be extremely desirable to establish a corrosion sensing technique for detecting corrosion at the interface between the metal and coating, in order to save time for maintenance and potential expensive replacement of part. Laboratory accelerated corrosion tests demonstrated that the embedded Fiber Bragg Grating (FBG) sensors inside both the soft and hard coatings can effectively quantify the corrosion rate, monitor the corrosion progress, and detect the coating damages and crack propagation of coated steel in real time.

In view of the above, it can be an object of the present invention to provide corrosion detection systems and methods which can be embedded within the material. Another object of the present invention can be to provide corrosion detection systems and methods that can detect corrosion at the interface, or boundary, between layers in the material, in the case of laminates or material with multiple layers. Still another object of the present invention can be corrosion detection systems and methods wherein the optimum distance between the embedded sensors can be calculated in order to provide corrosion protection for the material device as a whole. Another object of the present invention can be to provide corrosion detection systems and methods that do not affect the cross-sectional profile of the material/component to be detected. Yet another object of the present invention, can be to provide corrosion detection systems and methods that impose minimal SWaP on the user. Another object of the present invention is to provide corrosion detection systems and methods that are easy to manufacture in a cost effective manner, and that can be easily implemented and maintained.

SUMMARY OF THE INVENTION

Corrosion detection systems and methods in accordance with several embodiments of the present invention can include at least one fiber optic cable, which can be embedded in a material having at least two layers. Two of the layers can define an interface, and the fiber optic cable can be embedded at the interface. Each fiber optic cable can have a plurality of Fiber Bragg Gratings (FBG's) formed therein at predetermined intervals.

Each FBG can have a preselected geometry that can only allow a predetermined light wavelength to pass therethrough. The teeth geometry can include a tooth height, width and a tooth spacing, which can be chosen according to said desired predetermined light wavelength. A light source for inputting light and a photodetector can be connected to opposite exposed ends of the fiber optic cable. As corrosion occurs near an FBG, it experiences mechanical strain, which can further cause a slightly different wavelength to pass through the fiber optic cable. The change in in wavelength can be detected by the photodiode as being indicative of corrosion occurring at the site near the FBG. The photodiode can signal the user that the wavelength has changed via change (either and increase ora decrease) in photodiode illumination intensity.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The novel features of the present invention will be best understood from the accompanying drawings, taken in conjunction with their accompanying descriptions, in which similarly-referenced characters refer to similarly-referenced parts, and in which.

DETAILED DESCRIPTION OF THE EMBODIMENTS

Figure 1:
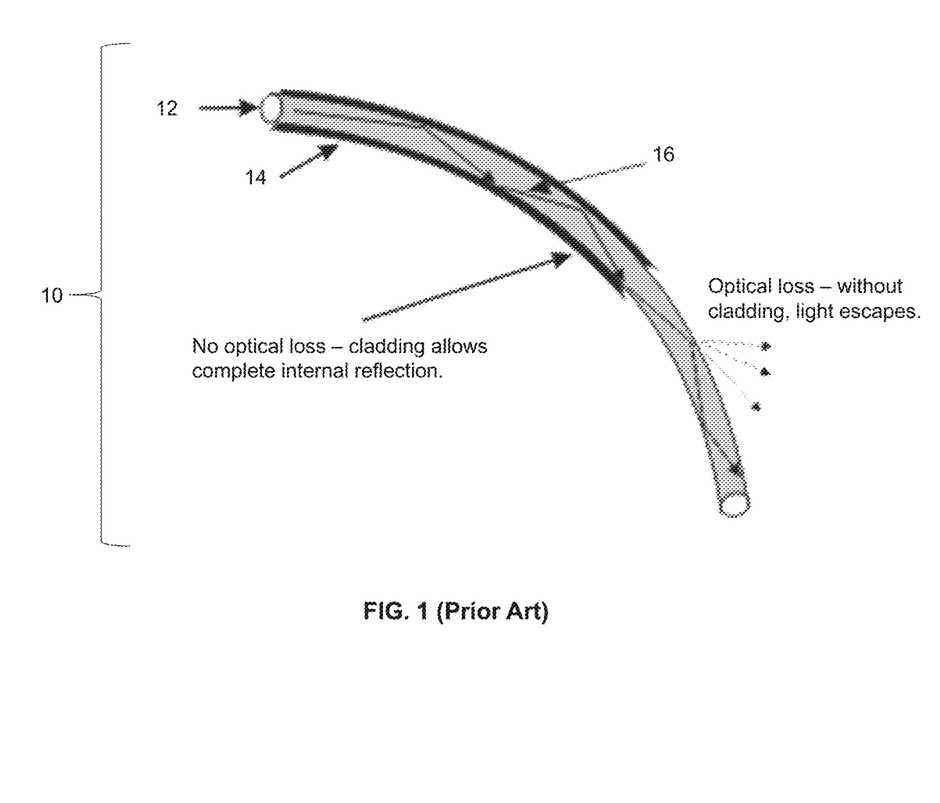
FIG. 1 is a prior art diagram of a fiber optic cable.

Referring now to FIG. 1, a prior art fiber optic cable can be shown, and can be generally designated using reference character 10. As shown fiber optic cable 10, can include a core 12 and a cladding 14 that can surround the core 12. Fiber optic cable 10 can be made by drawing glass (silica) to a diameter slightly thicker than a human hair. As shown in FIG. 1, cladding 14 can be included, which can cause the core to act as a cylindrical dielectric waveguide, which can transmit light 16 along its axis by process of internal reflection. Core 12 can be doped with germanium dioxide ($GeO_2$) to raise the Index of Refraction n.

Figure 2:
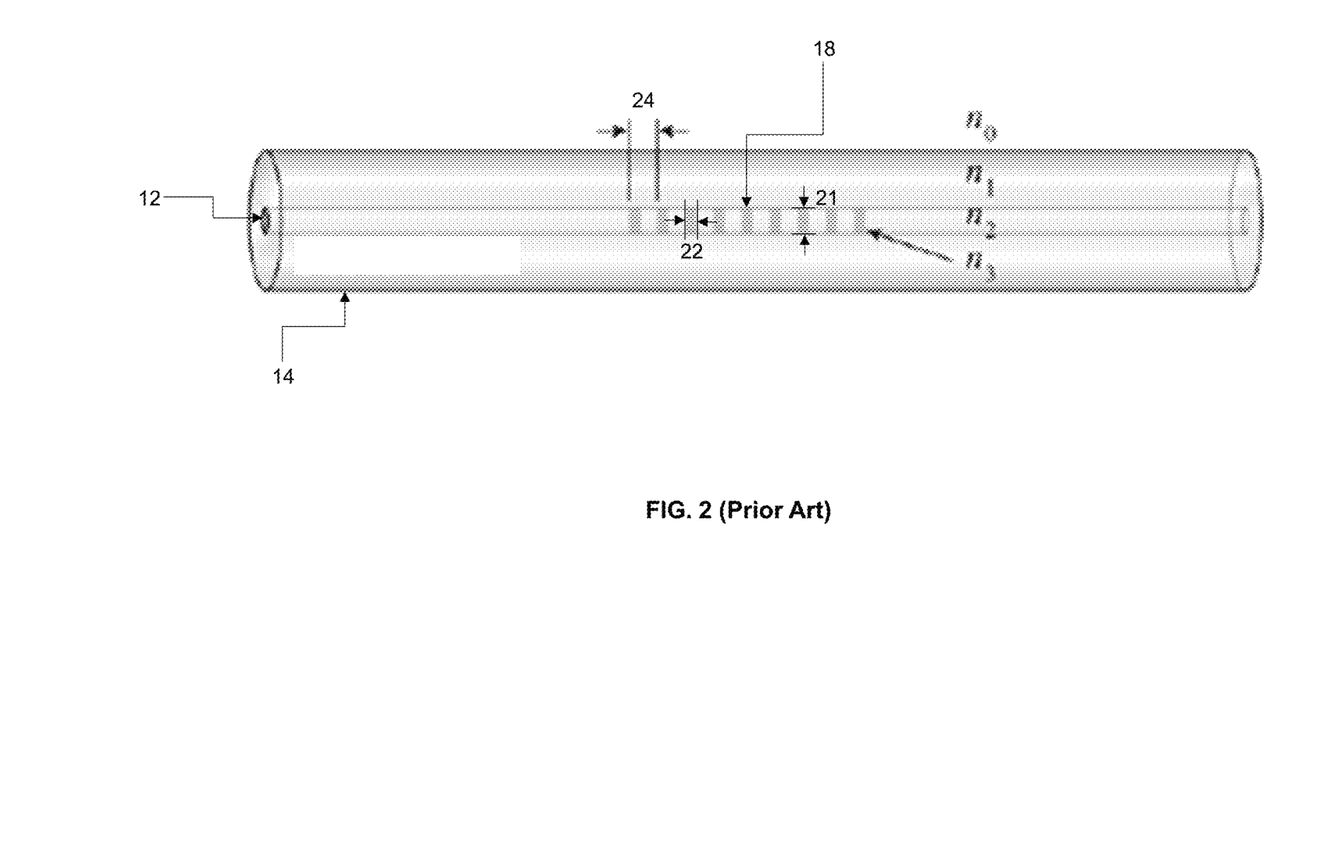
FIG. 2 is prior art diagram of the fiber optic cable of FIG. 1, but with a Fiber Bragg Grating (FBG) embedded in the fiber core.
Figure 3:
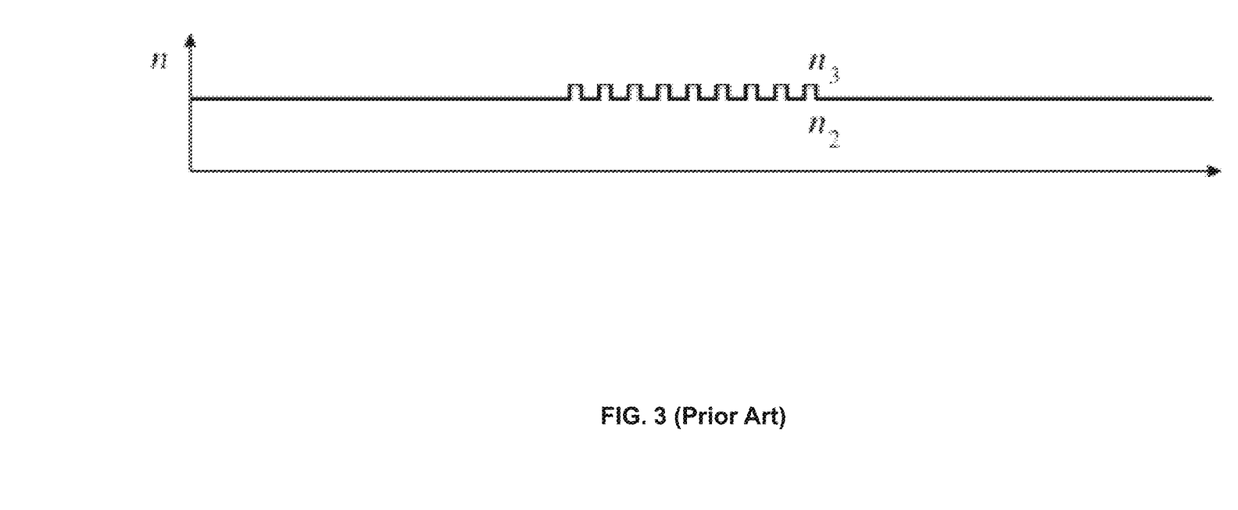
FIG. 3 is a prior art graph of the refractive index in the axis direction of the fiber core of FIG. 2, which can illustrate a change in behavior at the FBG when light passes therethrough.

Referring now to prior art FIGS. 2-3, core 12 can be formed with a Fiber Bragg Grating (FBG) 18, which can be seen and described in greater detail. As shown, FBG 18 can be a microstructure that can typically be a few millimeters in overall length (FIG. 2 is greatly enlarged). FBG 18 can a plurality of teeth 20, with each tooth having a tooth height 21 and a tooth width 22 and a tooth spacing 24 between successive teeth 20. Tooth height 21, tooth width 22 and tooth spacing 24, can be symmetrical, or it can be asymmetrical according to the design wavelength of the FBG 18. Once FBG 18 is established in cable 10, the desired effect can be established by transversely illuminating the fiber optic cable 10 with an ultraviolet (UV) laser beam to generate an interference pattern in core 12. The interference patterns can induce a permanent change in the physical characteristics of the silica (the portions that were illuminated by the UV laser beam), which can change the index (indices in some embodiments) of refraction "n", from refraction index $n_2$ in fiber core 12 to index $n_3$ when the light is passing thought a tooth 20, as depicted by FIG. 3. Other way of changing the refractive index n are also possible.

The structure of the FBG can be varied via the refractive index, or the grating period (tooth spacing 24). The grating period can be uniform or graded, and either localized or distributed in a superstructure. The refractive index has two primary characteristics, the refractive index profile, and the offset. Typically, the refractive index profile can be uniform or apodized, and the refractive index offset can be positive or zero. There are six common structures for FBG's: 1) Uniform positive-only index change; 2) Gaussian apodized; 3) Raised-cosine; 4) Apodized, chirped; 5) Discrete phase shift; and, 6) Superstructure. Although any of the profiles can be used, the embodiments described herein use the Uniform positive-only index change profile.

Other FBG's that could be used can include chirped FBG's, wherein the refractive index profile of the grating may be modified to add other features, such as a linear variation in the grating period (tooth spacing 24), called a chirp. The reflected wavelength changes with the grating period, broadening the reflected spectrum. A grating possessing a chirp has the property of adding dispersion—namely, different wavelengths reflected from the grating will be subject to different delays. This property has been used in the development of phased-array antenna systems and polarization mode dispersion compensation as well.

FBG's that could be used can include tilted FBG's 18. In standard FBGs, the grading or variation of the refractive index is along the length of the fiber (the optical axis), and is typically uniform across the width of the fiber. In a tilted FBG (TFBG), the variation of the refractive index is at an angle to the optical axis. The angle of tilt in a TFBG has an effect on the reflected wavelength, and bandwidth.

Still other FBG's 18 that could be used can include long-period gratings. Typically the grating period is the same size as the Bragg wavelength, as shown above. For a grating that reflects at 1,500 nm, the grating period is 500 nm, using a refractive index of 1.5. Longer periods can be used to achieve much broader responses than are possible with a standard FBG. These gratings are called long-period fiber grating. Longer period FBG's can typically have grating periods on the order of 100 micrometers, to a millimeter, and are therefore much easier to manufacture. For other embodiments, phase-shifted FBG's 18 could be used. Phase-shifted fiber Bragg gratings (PS-FBGs) can be thought of as an important class of gratings structures which can have interesting applications in optical communications and sensing due to their special filtering characteristics. These types of gratings can be reconfigured through special packaging and system design.

No matter what type of FBG 18 can be used, different coatings of diffractive structure are used for fiber Bragg gratings in order to reduce the mechanical impact on the Bragg wavelength shift for 1.1-15 times as compared to an uncoated waveguide:

$$\lambda_B = 2n/\Lambda$$

Where $\lambda_B$ is the reflected (Bragg) wavelength, n is the refractive index of the core and $\Lambda$ is the grating period. The fiber core 12 may expand to a different length (and thus have a different wavelength according to the relationship ($\alpha n + \alpha \Lambda)^* \alpha T$, where ($\alpha n + \alpha \Lambda$) can be the thermo-optic effect and $\Delta T$ can be the thermal expansion. Similarly, the strain-optic effect, $(1-P_e)$ and $\epsilon$ can be the strain.

Figure 4A:
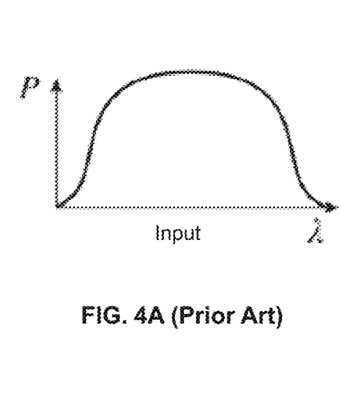
FIG. 4A is a prior art graph of intensity versus wavelength for the spectral input into the fiber optic cable of FIG. 2.
Figure 4B:
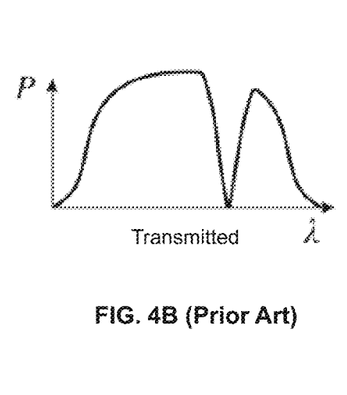
FIG. 4B is a prior art graph of intensity versus wavelength of light that is transmitted along the fiber optic cable of FIG. 2.
Figure 4C:
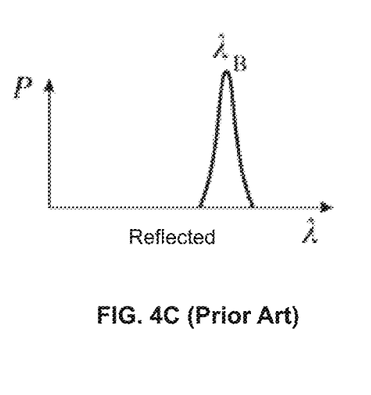
FIG. 4C is a prior art graph of intensity versus wavelength of light that is reflected by the fiber optic cable of FIG. 2.

For the present invention, the fiber optics cable system as described below can have the following parameters:
Count: 2-4
Max sensing fiber length: 40 feet
Max # sensors/system: 8,000
Max Sample rate: 20 Hz
Interface: Ethernet
Power: <50W @ 28Vdc
Weight (including enclosure): <15 pounds (lbs)
Size (application specific): 9.5×9.5×3 in
Cost: <$25K
Cooling: Conduction Referring now to prior art FIGS. 4A-4C, the spectral output intensity P of the generic FBG 18 of FIG. 2 can be seen. As shown, FBG 18 can cause fiber optic cable 10 to act as a dichroic mirror, allowing most of a wavelength spectrum of light 16 to pass (FIG. 4B), but reflecting a particular wavelength (FIG. 4C). Since FBG's can function as a dichroic mirror once the FBG is established, a change in spectral intensity P (increase or decrease, or even an absence P) at the output wavelength can be monitored. For systems that can detect a broadband response, a change in wavelength may be detected as a color change if the design wavelength is in the visible spectrum.

Figure 5:
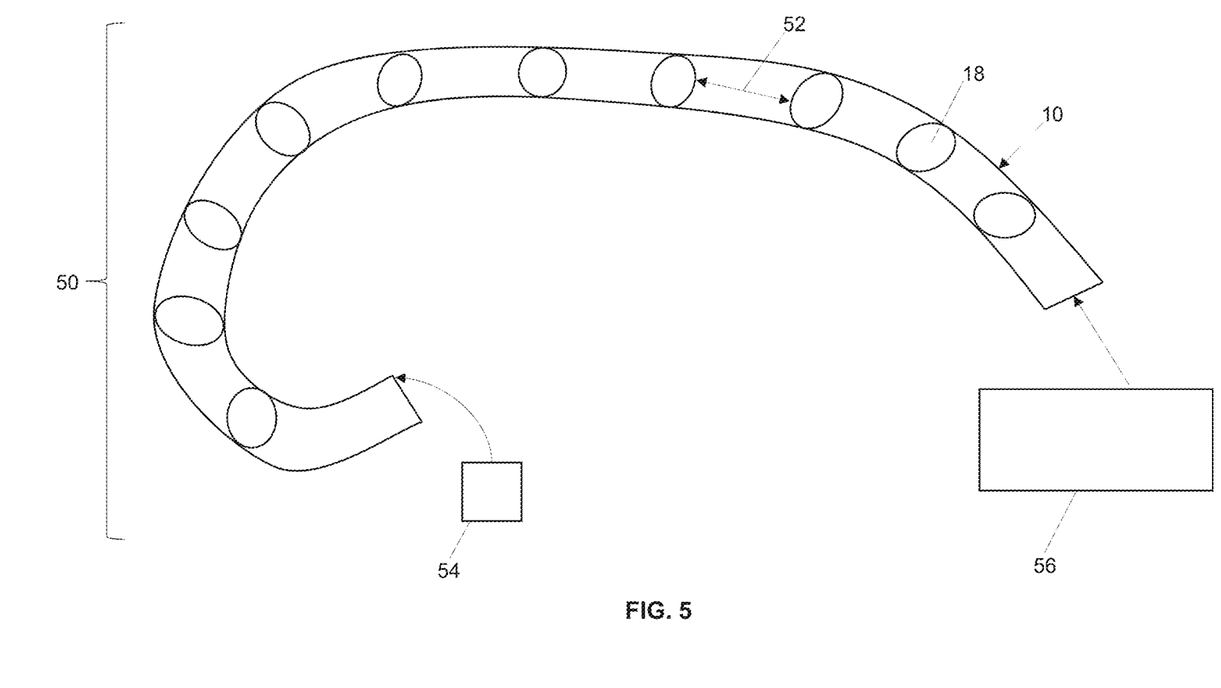
FIG. 5 is a block diagram of the corrosion detection systems of the present invention according to several embodiments.

Referring now to FIG. 5, a corrosion detection system 50 according to several embodiments of the present invention is shown. As shown, system 50 can include the aforementioned fiber optic cable 10. A plurality of FBG's 18 can be established in fiber optic cable 10, at a preselected interval distance 52. The geometry of the FBG teeth and spacing can be determined by a processor (not shown), which can have non-transitory written instructions that can output a predetermined distance 52, as well as FBG height 20, width 22 and spacing 24 (Please see FIG. 3 for FBG for tooth height 21, tooth width 22 and tooth spacing 24). It should be appreciated that distance 52 could be uniform or non-uniform, depending on the properties of the material to be monitored. Similarly, the FBG tooth height 21, tooth width 22 and tooth spacing 24 can be uniform or non-uniform, according to the type of FBG being establishing in cable 10. System 50 can further include a light source 54 and a photodiode 56 for reading an output wavelength of the FBG's 18.

Figure 6:
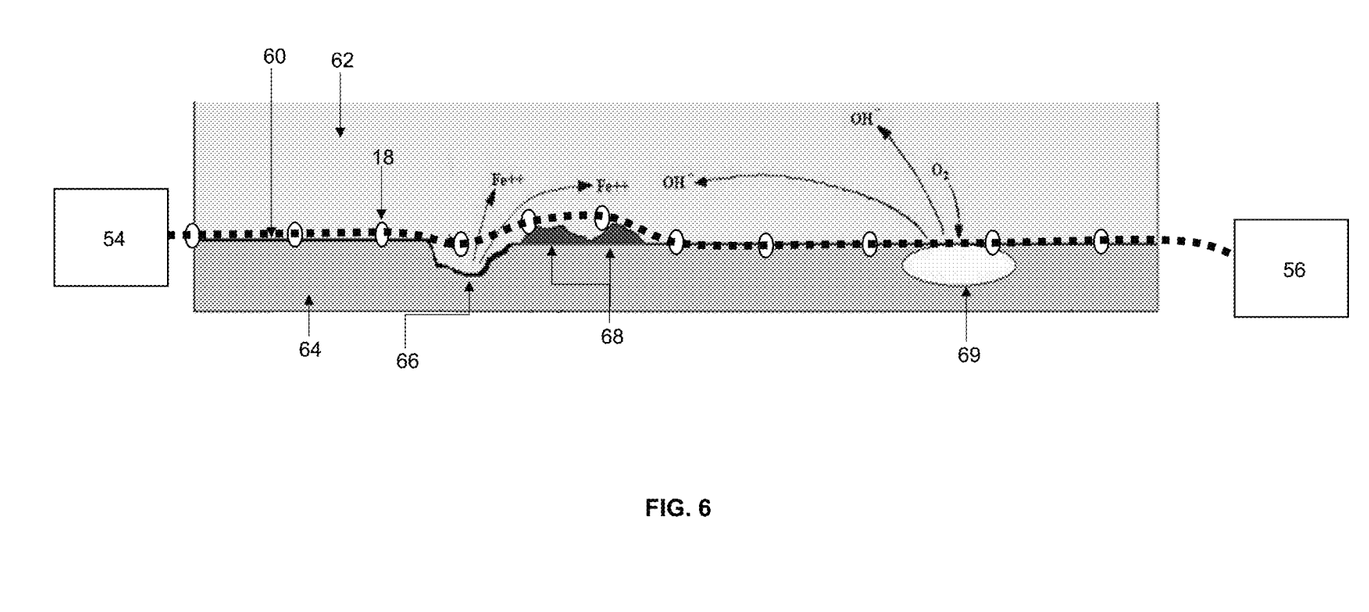
FIG. 6 is a block diagram of a system of FIG. 5, which can be embedded at the interface between a first layer and a second layer.

Referring now to FIG. 6, fiber optic cable 10 (shown as a dotted line in FIG. 6) can be embedded at an interface 60 between a first layer 62 (darker gray shade) and a second layer 64 (lighter gray shade in FIG. 6). Since corrosion typically begins at the interface between the first and second layers, FBG's 18 will typically experience a strain at a corrosion site 66, which can be thought of as an anodic area where metal dissolves. The strain will cause that FBG 18 at that location to output a slightly different wavelength than normal, which can be detected by photodiode 56. Thus, corrosion can be detected in real time by the system 50 according to several embodiments, and because the corrosion has been detected so early, the maintenance decision has more options, including possibly voyage repairs vice depot repairs. Similarly, other defects such as iron tuberculation 68 and dissolved oxygen reduction area 69 can also be detected in the same fashion.

Figure 7A:
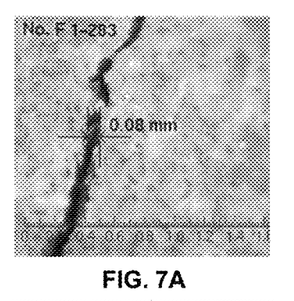
FIGS. 7A-7D are time-sequence color photographs of the same area under consideration, which depict corrosion that can be detected by the systems and methods according to several embodiments.
Figure 7B:
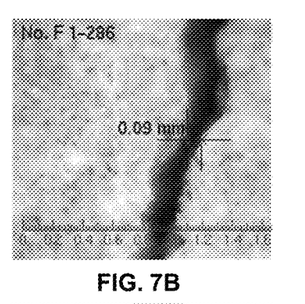
Figure 7C:
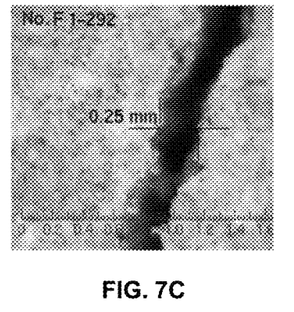
Figure 7D:
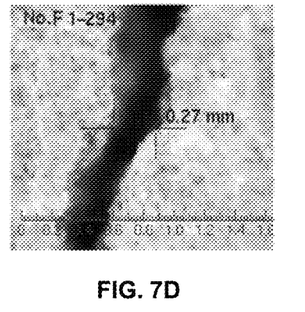

Referring now to FIGS. 7A-7D, a plurality time sequence photographs on a single sample area over time can be shown as a depiction of the above-described phenomena. System 50 can take the output to photo diode and allow the user to literally watch corrosion spread (microscopically) in real time. FIG. 7A shows the defect as initially detected at 0.08 millimeters. In FIG. 7D, the defect has tripled in width over time to 0.27 millimeters. It should be appreciated that the time for corrosion can vary with the environmental conditions and the type of materials that are being corroded. Typically, metal deformation can begin to happen in 7 to 10 days, given optimal conditions for corrosion.

Figure 8:
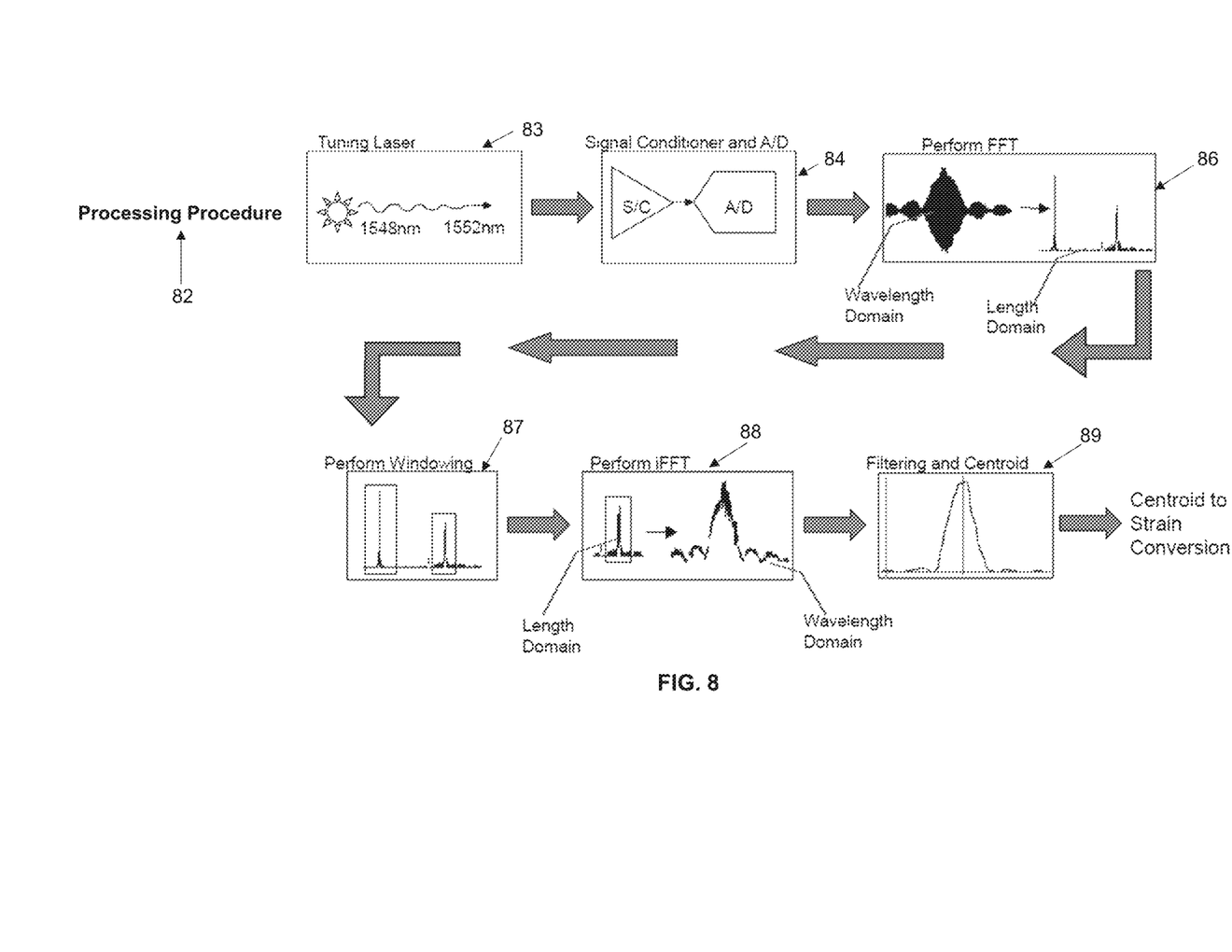
FIG. 8 is a diagram which illustrate the processing procedures that can be used by the corrosion detection systems and methods of the present invention.

Referring now to FIG. 8, a general flow diagram 82 of the processing procedure for the output of the photo diode can be shown. A photo diode output can be provided, as shown in block 88. To do this, the tuning laser (photo diode putout) shown in block 82 can be tuned to the 1548-1552 nanometer range. Other ranges can be used. Tuning laser can be proceed as in input in a signal conditioner and analog to digital converter (A/D), as shown in block 84. A Fast Fourier Transfer (FFT) can be performed on the A/D output, initially in the wave domain, and then subsequently converted to an FFT in the length domain, as shown by block 86.

As shown in block 86, the resulting FFT in the length domain will result in some peaks in wavelengths of interest. The peaks can be windowed in a manner known in the art to further process and isolate the output signal, as shown in block 87. An inverse FFT can be performed on the resulting windows 87 to convert back to the wavelength domain, as can be shown by block 89. Window 88 n the wavelength of interest can now be shown and displayed as known in the art, as depicted by block 89.

Figure 9A:
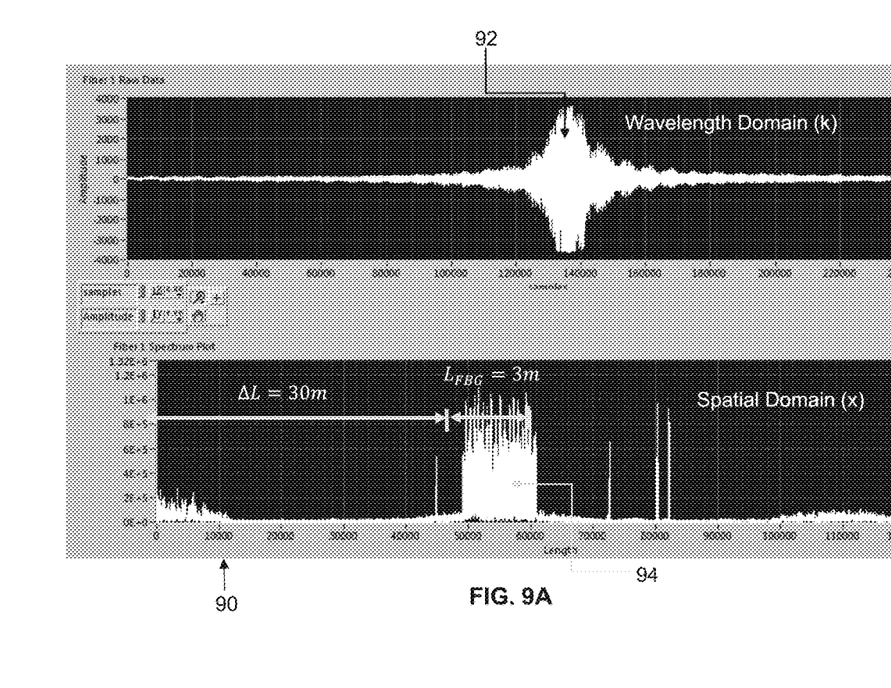
FIG. 9A is a screenshot of an analyzer output, which can illustrate the how the wavelength domain can be converted to a length domain form for the processing procedure of FIG. 8.
Figure 9B:
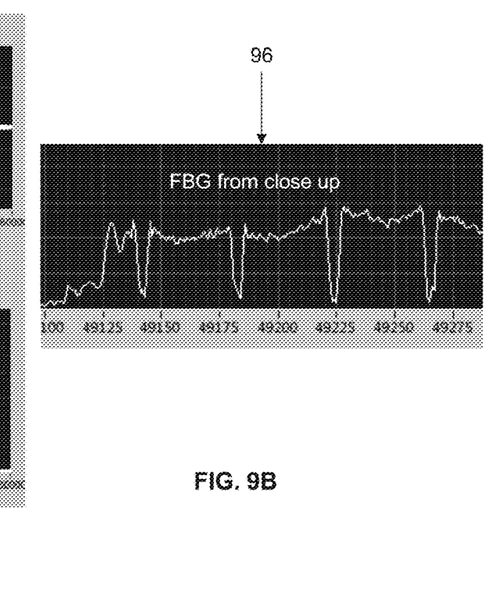
FIG. 9B is a graph of the length domain, which show the region of interest form FIG. 9A in greater detail.

Referring now to FIGS. 9A-9B, spectrum analyzer outputs of the signal processing methodology can be shown. For the output display 90 shown in FIG. 9, the wavelength domain display 92 corresponds to the wavelength domain shown in block 86, while the spatial domain display 94 in FIG. 9A can correspond to the length domain shown in block 86. The display window 96 shown in FIG. 9B can correspond to the window 87 in FIG. 8. The peaks/anti-peaks in display 96 are indicative of light that has passed/not passed through the FBG. If a defect is present in the material, the lights will have further passed through the defect (or will have been blocked by the defect, which effectively functioned as a grating), and the presence/additional presence or absence of light will be indicated at display 96.

Figure 10:
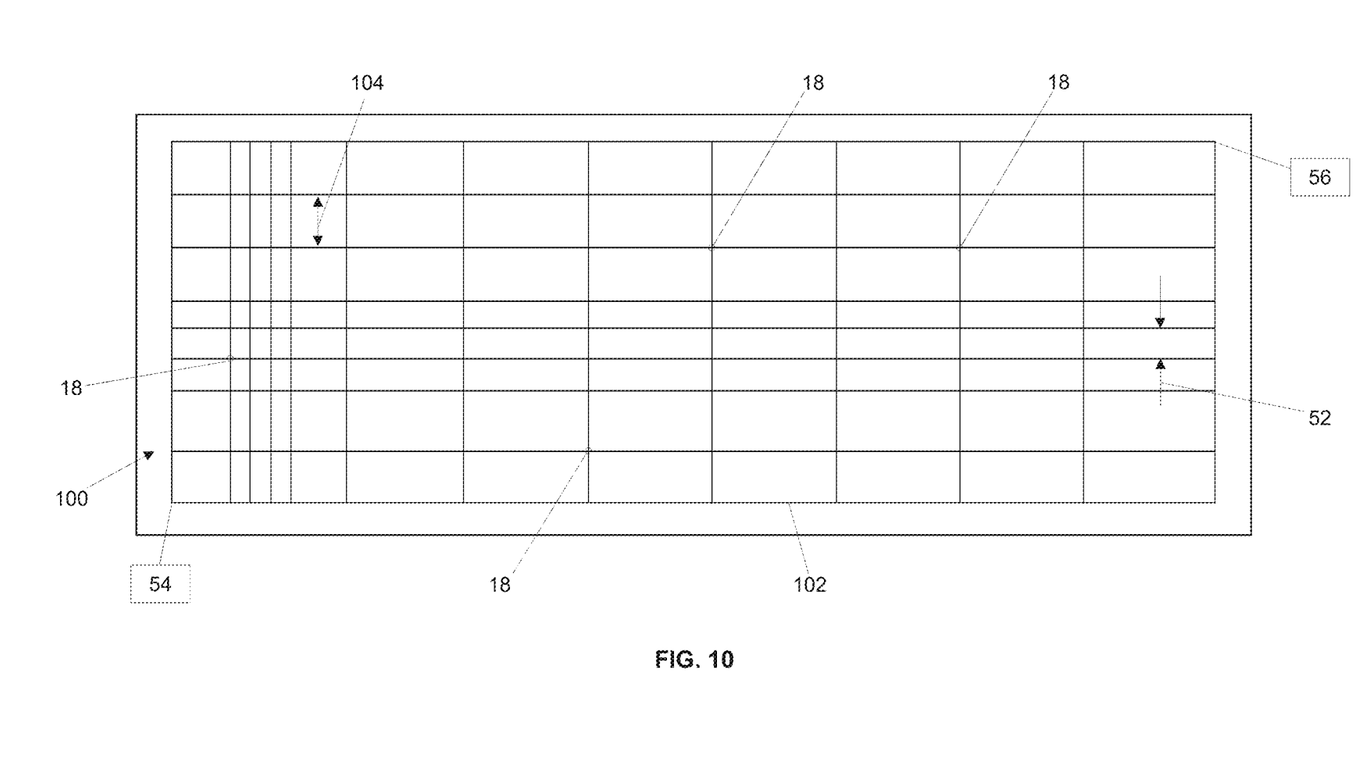
FIG. 10 can be a top plan view of a generic surface area under test, which can illustrate how the invention can be applied to large surface area applications; and, FIG. 11 is a block diagram, which can be used to depict steps that can be taken to accomplish the methods of the present invention according to several embodiments.

Referring now to FIG. 10, a top plan view of a generic surface area 100 that can be under test can be shown. As shown, area 100 can include a grid 102 of fiber optic cables 10. Cables 10 can have a grid spacing 104. The number of cables 100 and grid spacing 104 can be determined using a predetermined algorithm, which can be based on the dimension and materials of fiber optic cable 10, the number and placement FBG's 18, and the spacing and dimensions of the teeth 20 within FBG 18. It should be appreciated that different FBG's 18 with different FBG intervals 52 with asymmetrical dimensions could be used, and grid spacing 104 could also be asymmetrical. This can be true for systems that have known stress concentrations that need to be monitored, or for systems that are installed in surface areas with multiples layers that are under test. If the layers have different layer material combinations, a different FBG 18 design wavelength can be needed. With respect to the grid spacing 104, it may be known that the area 100 under test will have stress concentration areas, and it may be advantageous to play cable 100 closer to each other, or even in a concentric or non-parallel (the cables converge to a give location) geometric arrangement.

Figure 11:
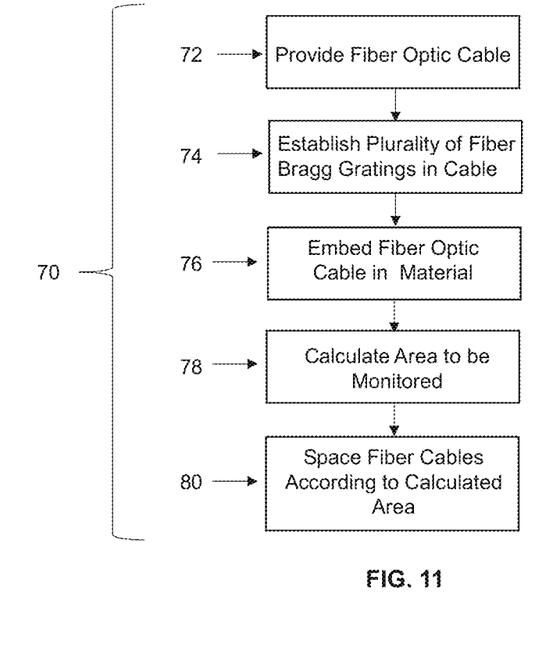

Referring now to FIG. 11, a block diagram is shown, which can be representative of steps that can be taken to accomplish the methods of the present invention according to several embodiments. In FIG. 11, one such methods can be shown by method 70. Method 70 can include the initial step 72 of providing a fiber optic cable, as shown by block 72. Method 70 can also include the initial step 74 of establishing a plurality of FBG's 18 in cable 10, and also the step 76 of embedding the fiber optic cable 10 at the interface between a first layer and a second layer of a material to be monitored for corrosion. The method 70 can also include the steps 78 of calculating the surface are of the material to be monitored, and spacing the fiber optic cables 80 accordingly (based on the calculation of the surface area). Steps 78 and 80 can be accomplished by a processor (not shown).

The use of the terms "a" and "an" and "the" and similar references in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for detecting corrosion in a material having a first layer and a second layer, said method comprising the steps of:
   A) providing two or more fiber optic cables;
   B) establishing a plurality of Fiber Bragg Gratings (FBG's) in said fiber optic cables;
   C) embedding said two or more fiber optic cables in said material at the interface between said first layer and said second layer
   D) calculating the area of the material that is to be monitored for corrosion; and,
   E) spacing two or more said fiber optic cables based on the results of said step D).

2. The method of claim 1, wherein said step B) is accomplished so that each said FBG in said plurality has a plurality of teeth, said teeth having geometry, said teeth geometry further comprising tooth height, tooth width and distance between adjacent said teeth.

3. The method of claim 2, wherein said tooth height is selectively manipulated so that only a preselected wavelength passes through said fiber optic cable.

4. The method of claim 2, wherein said tooth width is selectively manipulated so that only a preselected wavelength passes through said fiber optic cable.

5. The method of claim 2, wherein said distance is selectively manipulated so that only a preselected wavelength passes through said fiber optic cable.

6. The method of claim 2, further comprising the steps of:
   F) illuminating said fiber optic cable with a light source; and,
   G) receiving light from said step F) which has passed though said fiber optic cable with a photodiode.

* * * * *